United States Patent
Gupta et al.

(10) Patent No.: US 8,611,347 B2
(45) Date of Patent: Dec. 17, 2013

(54) POINT-TO-MULTIPOINT SERVICE IN A LAYER TWO ETHERNET NETWORK

(75) Inventors: Manish Gupta, San Jose, CA (US); Apurva Mehta, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 588 days.

(21) Appl. No.: 12/847,505

(22) Filed: Jul. 30, 2010

(65) Prior Publication Data
US 2011/0292937 A1 Dec. 1, 2011

Related U.S. Application Data

(60) Provisional application No. 61/348,091, filed on May 25, 2010.

(51) Int. Cl.
*H04L 12/28* (2006.01)
(52) U.S. Cl.
USPC ............ 370/390; 370/419; 370/428; 709/242
(58) Field of Classification Search
None
See application file for complete search history.

(56) References Cited

U.S. PATENT DOCUMENTS 7,558,219 B1  7/2009  Aggarwal et al.
2011/0164617 A1*  7/2011  Yong .............................. 370/392
2011/0242988 A1*  10/2011  Rustogi et al. ................ 370/242

OTHER PUBLICATIONS

Key et al., "Extension to VPLS for E-Tree," draft-key-l2vpn-vpls-etree-01.txt, Network Working Group, Nov. 9, 2009, 25 pp.

* cited by examiner

*Primary Examiner* — Yemane Mesfin
*Assistant Examiner* — Khoa Huynh
(74) *Attorney, Agent, or Firm* — Shumaker & Sieffert, P.A.

(57) ABSTRACT

Techniques are described for providing point-to-multipoint (P2MP) Ethernet service in a L2 network. Routers providing the Ethernet service allow an administrator to classify local attachment circuits as either "leaf" attachment circuits or "root" attachment circuits to define a tree-like architecture for forwarding Ethernet frames within a VPLS domain. Based on the classifications, each of router constructs flood domains, referred to herein as mesh groups, that control switching behavior between attachment circuits and pseudowires that transport the L2 communications through the VPLS domain. The routers utilize the mesh groups when switching L2 communications to enforce the requirements of E-TREE service or other L2 services in which L2 traffic is constrained within the L2 VPN to tree-like connectivity.

27 Claims, 8 Drawing Sheets

POINT-TO-MULTIPOINT SERVICE IN A LAYER TWO ETHERNET NETWORK

This application claims the benefit of U.S. Provisional Application No. 61/348,091, filed May 25, 2010, which is hereby incorporated by reference in its entirety.

TECHNICAL FIELD

The invention relates to electronic computer networks and, more specifically, to layer two (L2) computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 network is an Ethernet network in which end point devices (e.g., servers, printers, computers) are connected by one or more Ethernet switches. The Ethernet switches forward Ethernet frames, also referred to as L2 communications or L2 packets, to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically broadcasts the Ethernet frame to all of the other physical ports of the switch unless the Ethernet switch has learned the specific physical port through which to the destination MAC address devices is reachable. In this case, the Ethernet switch forwards a single copy of the Ethernet frame out the associated physical port.

One type of large area L2 network connectivity being developed is referred to as "Metro Ethernet" in which Ethernet is used as a metropolitan access network to connect subscribers and businesses to a larger service network or the Internet. Various types of Ethernet services have been defined to provide different forms of connectivity. For example, so called "E-LINE" service, also known as Virtual Leased Line (VLL) or Ethernet Private Wire Service (EPVS), provides point-to-point (P2P) connectivity. "E-LAN" service, also known as Virtual Private LAN Services (VPLS) and Transparent LAN Services, provides multipoint-to-multipoint (MP2MP) connectivity in which there is no communication restriction between devices. A third type of metro Ethernet service, referred to as "E-TREE" service, has recently been defined in which Ethernet communication is constrained to point-to-multipoint (P2MP). With E-TREE service, each endpoint L2 device is designated as either a root or a leaf L2 devices designated as roots are permitted to communicate with all other endpoints on the E-Tree. However, L2 devices designated as leafs on the E-tree are permitted to communicate only with L2 devices designated as root devices.

SUMMARY

In general, techniques are described for providing point-to-multipoint (P2MP) Ethernet service in a L2 network. For example, in one implementation a large-scale L2 metropolitan Ethernet network supports virtual private local area network service (VPLS) that provides L2 connectivity for remote customer networks, i.e., VPLS sites, through an intermediate network. Network devices within the intermediate network, such as routers offering L2 Ethernet services, provide label switched paths (LSPs) that may be used to transport encapsulated L2 communications from the customer networks pseudowires as if these customer networks were directly attached to the same local area network (LAN).

In accordance with the techniques described herein, the routers allow an administrator to classify local attachment circuits as either "leaf" attachment circuits or "root" attachment circuits to define a tree-like architecture for forwarding Ethernet frames within the VPLS domain. The routers may automatically exchange the configuration information using, for example, the Border Gateway Protocol. Based on the user-assigned classifications, each of router constructs flood domains, referred to herein as mesh groups, that controls switching behavior between attachment circuits and pseudowires that transport the L2 communications through the VPLS domain. That is, the routers utilize the mesh groups when making L2 forwarding decisions to enforce the requirements of E-TREE service or other L2 services in which L2 traffic is constrained within the L2 VPN to tree-like P2MP connectivity.

These techniques may provide one or more advantages. For example, the techniques may allow a network device (e.g., an L2 switch or an device offering integrated L3/L2 services) to implement an L2 VPN (e.g., by way of VPLS) to offer full L2 connectivity, yet enforce constrained forwarding within the L2 VPN to allow only tree-based connectivity, as typically required by E-TREE service. This may allow the service provider to efficiently implement the E-TREE service, even in existing L2 VPN deployments. The techniques may allow the service provider to provide improved services, such as improved accounting related to delivery of content, by enforcing L2 E-TREE service in which leaf-to-leaf L2 switching is prevented, which may otherwise circumvent accounting of delivered content over the root attachment circuits. Moreover, by enforcing L2 E-TREE service, the service provider may offer a higher degree of security and protection for individual subscribers by preventing leaf-to-leaf L2 switching.

In one embodiment, a network device comprises a set of interfaces to couple the network device to local attachment circuits that carry layer two (L2) communications and a set of interfaces to couple the network device to a plurality of remote network devices that provide an L2 virtual private network (VPN) by encapsulating the L2 communications within pseudowires. The network device further comprises a computer-readable storage medium storing configuration data that classifies each of the local attachment circuits of the network device as either a root attachment circuit or a leaf attachment circuit, and wherein the configuration data identifies each of remote network devices as hosting only leaf attachment circuits or hosting at least one root attachment circuit. A control unit assigns the local attachment circuits of the network device and the pseudowires to a plurality of mesh groups for the L2 VPN based on the configuration data. A switching element is programmed to switch the L2 traffic between the attachment circuits of the network device and the pseudowires based on the mesh groups to constrain the L2 VPN to tree-based connectivity.

In one embodiment, a method comprises storing configuration data within a network device that switches layer two (L2) communications between local attachment circuits hosted by the network device and a plurality of pseudowires of an L2 virtual private network (VPN) provided by a plurality of network devices. The configuration data classifies each local attachment circuit of the network device as either a root attachment circuit or a leaf attachment circuit, and wherein the configuration data identifies each of other network devices as hosting only leaf attachment circuits or hosting at least one root attachment circuit. The method further comprises assigning the local attachment circuits of the network device and the pseudowires to a plurality of mesh groups for the L2 VPN based on the configuration data; and switching the L2 communications between the attachment circuits of the network device and the pseudowires based on the mesh groups to constrain the L2 VPN to tree-based connectivity.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
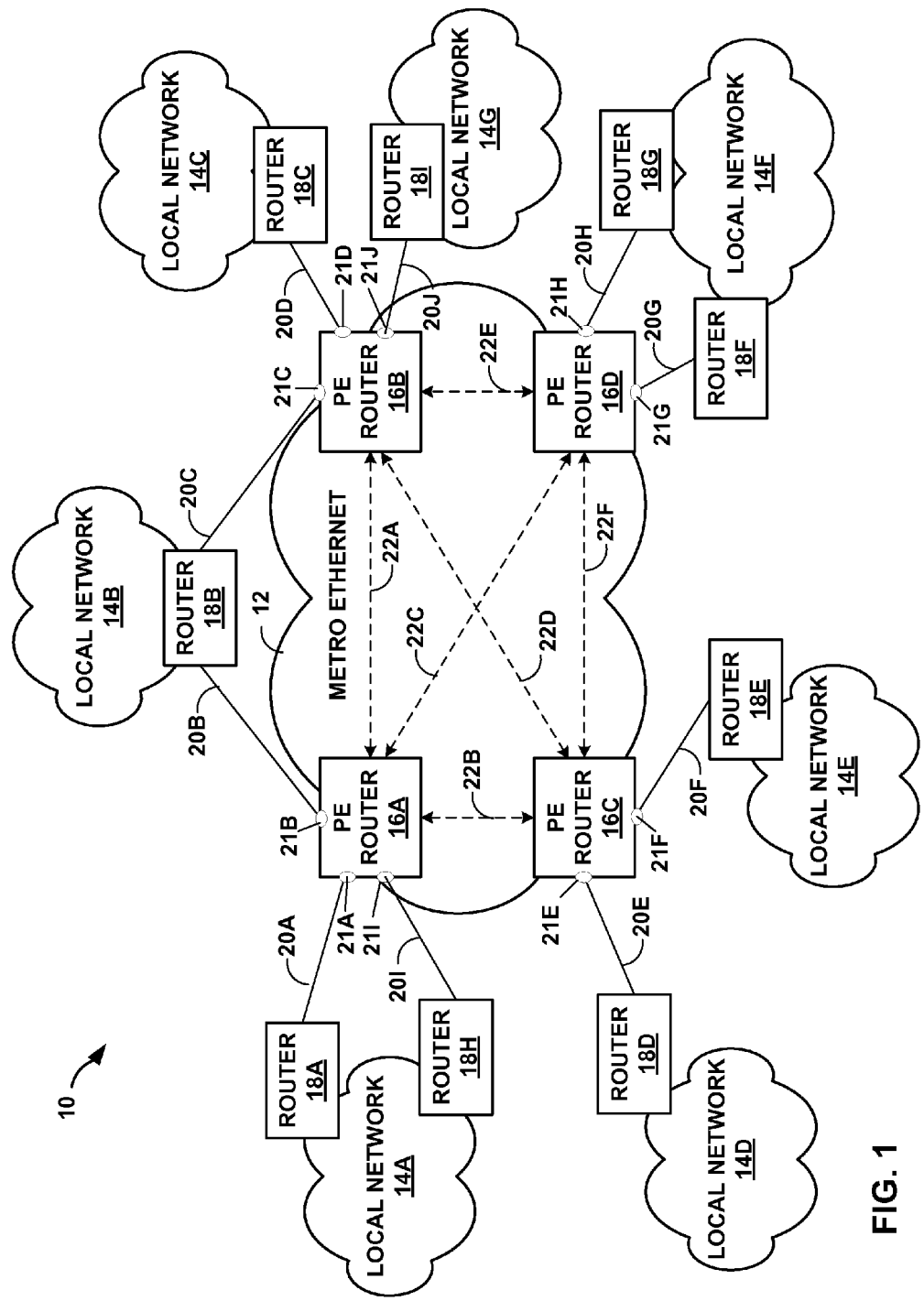
FIG. 1 is a block diagram illustrating an example network system in which routers within a metropolitan ("metro") Ethernet network provide E-TREE service in accordance with the techniques described herein.

FIG. 1 is a block diagram illustrating an example network system 10 in which a metropolitan ("metro") Ethernet network 12 provides L2 connectivity between multiple provider edge (PE) routers 16A-16D ("PE routers 16"). In the example of FIG. 1, network 12 is a large-scale L2 metro Ethernet network that provides L2 connectivity for remote customer networks, local networks 14A-14F ("local networks 14"). Network 12 may represent a public network that is owned and operated by a service provider to interconnect a plurality of edge networks, such as local networks 14.

PE routers represent edge routers that provide layer three (L3) routing functions as well as L2 Ethernet switching services for communicating L2 traffic from customer edge routers 18A-18G ("CE routers") of local networks 14. PE routers 16 include attachment circuits 21 (e.g., L2 interfaces) that couple the PE routers to CE routers 18 via network links 20A-20C ("links 20"). While discussed with respect to routers, PE routers 16 may each represent any network device capable of providing L2 forwarding services. For example, PEs 16 may each represent, in certain instances, one or more of a switch, a hub, a bridge device (e.g., an Ethernet bridge), or any other L2 network device and, in the case of an edge router, an L3 network device capable of performing L2 functionality.

Each of local networks 14 may also include one or more of a plurality of CE routers 18 that reside at edges of the local networks 14. CE routers 18 may each represent any network device capable of providing L2 forwarding service. For example, CE routers 18 may each represent, in certain instances, one or more of a switch, a hub, a bridge device (e.g., an Ethernet bridge), or any other L2 network device and, in some instances, L3 network devices capable of performing L2 functionality. Each of local networks 14 may operate according to a wide variety of network protocols, such as any of the 802.3X family of network protocols related to the Ethernet protocol and promulgated by the IEEE. Further details of the Ethernet protocol may be found, for example, in IEEE 802.3 Standard, available from the IEEE Standards Association, the entire contents of which are incorporated herein by reference. Although not shown in FIG. 1 for ease of illustration purposes, each of customer networks 16 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

In one implementation, PE routers 16 offer a Virtual Private Large Area Network (LAN) Service (VPLS) to virtually interconnect various L2 or data link layer networks. That is, PE routers 16 may be configured to provide VPLS services so as to transparently interconnect L2 networks, e.g., local networks 14, to one another via metro Ethernet network 12. Metro Ethernet network 12 may provide VPLS by transparently emulating a direct connection between these various local networks 14 such that, from the perspective of local networks 14, each of local networks 14 appears to directly connect to one another. That is, from an L2 perspective, local networks 14 associated with PE routers 16 may operate as if directly connected. Reference to layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubret Zimmermann, published in IEEE Transactions on Communications, vol. 28, no. 4, dated April 1980, which is hereby incorporated by reference as if fully set forth herein.

In the example of FIG. 1, PE routers 16 define a full mesh of label switched paths (LSPs) within metro Ethernet network 12 to carry encapsulated L2 communications across metro Ethernet network 12. The LSPs may be used as a transport for bidirectional pseudowires that use two LSPs to emulate a L2 communication service, such as Ethernet, over metro Ethernet network 12 in order to exchange encapsulated L2 communications, such as Ethernet packets, as though devices of the VPLS sites (i.e., local networks 14) were directly attached to the same local area network (LAN). Example bidirectional pseuedowires are described in further detail in RFC 4447, "Pseudowire Setup and Maintenance Using the Label Distribution Protocol (LDP)," available from The Internet Engineering Task Force (IETF), April 2006, the entire contents of which are incorporated herein by reference.

As described herein, PE routers 16 are configured to provide P2MP Ethernet service within the VPLS domain across metro Ethernet network 12. That is, PE routers 16 are configured to provide constrained forwarding of L2 traffic between CE routers 18 so as to provide P2MP forwarding within the VPLS domain. In this way, PE routers 16 may continue to provide L2 connectivity by utilizing VPLS, which typically provides multipoint-to-multipoint (full connectivity) within the L2 network, yet provide constrained forwarding as may be required by E-TREE or other P2MP Ethernet services.

In accordance with the techniques described herein, PE routers 16 allow an administrator to classify attachment circuits 21 of each of PE routers 16 as either a "leaf" attachment circuit or a "root" attachment circuit to define a tree-like architecture for forwarding Ethernet frames (which are referred to herein as L2 communications or L2 packets) between routers 18 of local networks 14. That is, based on the characteristics of local networks 14, the administrator determines whether each customer network is to be considered as hosting root devices that are allowed to communicate with all other devices within the VPLS domain or hosting leaf devices that are allowed only to communicate with root devices. As one example, local networks 14B and 14C may belong to application service providers that source IP video and other content to subscriber devices located in local networks 14A and 14D-14F. In this case, the administrator may designate attachment circuits 21B, 21C and 21D as root attachment circuits and attachment circuits 21A, 21E, 21F, 21G, 21H as leaf attachment circuits.

Based on the user-assigned classifications, each of PE routers 16 executes a software process to assign its attachment circuits 21 to different flood domains referred to herein as mesh groups. For example, each of PE routers 16 assigns its "root" attachment circuits 21 into one mesh group and its "leaf" attachment circuits 21 into a different mesh group. In this way, each of PE routers 16 assigns its local attachment circuits into two possible mesh groups. In addition, each of PE routers 16 classifies the pseudowires leading to other remote PE routers 16 into different mesh groups depending upon whether the remote PE routers are hosting only leaf attachment circuits or one or more root attachment circuits. That is, for any given PE router 16, pseudowires 22 leading from that PE router to remote PE routers hosting only leaf attachment circuits 21 are grouped into a common mesh group. Similarly, for any given PE router 16, pseudowires 22 leading from that PE router to remote PE routers hosting one or more root attachment circuits 21 are grouped into a different common mesh group. In this way, from the perspective of each of PE routers 16, local attachment circuits 21 and pseudowires 22 leading to other PE routers may be grouped into four distinct mesh groups: (1) "LEAF-CE-MG" for local leaf attachment circuits, (2) "ROOT-CE-MG" for local root attachment circuits, (3) "LEAF-VE-MG" for pseudowires leading to remote PE routers hosting only leaf attachment circuits, and (4) "ROOT-VE-MG" for remote PE routers hosting one or more root attachment circuits. Each PE router 16 establishes these four mesh groups from the perspective of that individual PE router. That is, the assignments to the mesh groups for one PE router may be different from assignments at a different PE router.

PE routers 16 control switching behavior for L2 traffic within a given VPLS domain based on the defined mesh groups. That is, PE routers 16 utilize the mesh groups when making L2 forwarding decisions to enforce the constraints required for E-TREE service or other L2 services in which L2 traffic is constrained to tree-like connectivity. This includes intra-mesh group and inter-mesh group switching of L2 traffic.

In particular, with the exception of the ROOT-CE-MG mesh group, PE routers 16 generally prevent switching of L2 traffic between local attachment circuits within the same mesh group. For example, when forwarding L2 traffic, each of PE routers 16 prevent switching of traffic between attachment circuits within its LEAF-CE-MG, LEAF-VE-MG and ROOT-VE-MG mesh groups. As explained in further detail below, this prevents local leaf attachment circuits of a PE router from communicating with each other within the VPLS domain and also prevents leaf attachment circuits of remote PE routers 16 from indirectly communicating with each other through pseudowires 22. PE routers 16 permit local switching of traffic only between attachment circuits of ROOT-CE-MG mesh group. This allows local root attachment circuits to communicate with each other within the VPLS domain, as is typically required by E-TREE service.

PE routers 16 also control switching of L2 traffic between different mesh groups within the VPLS domain. In general, PE routers 16 apply a default behavior which is to switch traffic received on a particular mesh group to all other mesh groups. PE routers 16, however, apply certain constraints to enforce the E-TREE topology. For example, PE routers 16 prevent switching of traffic between pseudowires within the LEAF-VE-MG and local attachment circuits in the LEAF-CE-MG as well as pseudowires in the ROOT-VE-MG. This restricts communication between leaf circuits hosted on different PE routers 16.

In this way, PE routers 16 implement an L2 VPN (e.g., by way of VPLS) to offer full L2 connectivity between local networks 14, yet enforce constrained forwarding within the domain to provide tree-based connectivity within the L2 network as typically required by E-TREE service. This may allow the service provider to efficiently implement the E-TREE service, which may be advantageous in situations where individual subscriber devices receive services from application service providers. In this respect, the service provider may provide improved services, such as improved accounting related to delivery of content, by enforcing L2 E-TREE service in which leaf-to-leaf L2 switching is prevented, which may otherwise circumvent accounting of delivered content over the root attachment circuits. Moreover, by enforcing L2 E-TREE service, the service provider may offer a higher degree of security and protection for individual subscribers by preventing leaf-to-leaf L2 switching. The techniques described herein may allow the service provider to implement an E-TREE service within a conventional VPLS domain or other L2 VPN environment.

Figure 2:
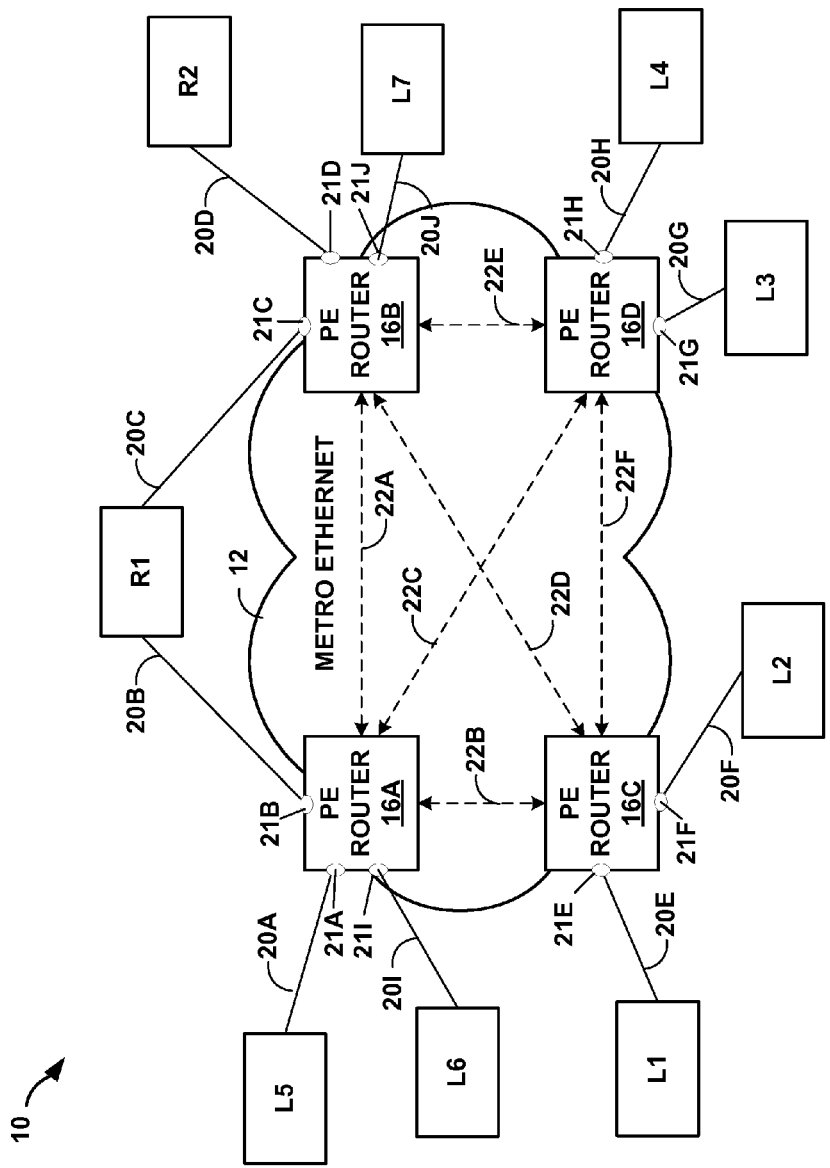
FIG. 2 is a block diagram illustrating an example logical organization of the network of FIG. 1 in which attachment circuits have been designated as root circuits ("R") or leaf circuits ("L").

FIG. 2 is a block diagram illustrating an example logical organization of network 10 of FIG. 1 in which the attachment circuits 21 have been designated as root circuits ("R") or leaf circuits ("L"). In this example, PE routers 16 have been designated as hosting root attachment circuits R1 and R2 and leaf attachment circuits L1-L7 as shown in FIG. 2, where the root or leaf designation is shown in place of CE routers 18 (FIG. 1).

One or more administrators may input configuration data at each of PE routers 16 to classify each local attachment circuit 21. PE routers may automatically exchange their configuration data so as to learn the existence and designation of remote attachment circuits by way of a protocol, such as the Border Gateway Protocol (BGP), that has been extended to carry the configuration data. In the case of BGP, routing communities may be configured so that a given PE router 16 may discover whether each remote PE router locally hosts only leaf attachment circuits or at least one root attachment circuit. For example, a first BPG routing community may be defined for PE routers 16 that host only a single attachment circuit and a second BPG routing community may be defined to designated PE routers that host at least one root attachment circuit.

In this example, attachment circuits 21A, 21I, 21E, 21F, 21G, 21H, and 21J have been designated as leaf attachment circuits. Attachment circuits 21B, 21C, and 21D have been designated as root attachment circuits. If BGP is used to exchange configuration data, PE routers 16A and 16B may announce membership within a BGP routing community defined for PE routers that host at least one root attachment circuit while PE routers 16C and 16D announce membership with the BGP community defined for PE routers that host only leaf attachment circuits. In the event auto discovery of the configuration data is not utilized, one or more administrators may input all of the configuration information into each of the PE routers 16 or into a central provisioning system.

After exchanging configuration data, e.g., by way of BGP route communities, each of PE routers 16 partitions its local attachment circuits and pseudowires for which it provides ingress into the above-described mesh groups. In the above example, PE router 16A computes its mesh groups as shown in TABLE 1:

TABLE 1

| LEAF-CE-MG | {AC 21A, AC 21I} |
|---|---|
| ROOT-CE-MG | {AC 21B} |
| LEAF-VE-MG | {PW 22B, PW22C} |
| ROOT-VE-MG | {PW 22A} |

In particular, PE router 16A computes its LEAF-CE-MG mesh group as the set of local attachment circuits 21A, 21I designated as leaf circuits L5, L6, respectively. Similarly, PE router 16A computers its ROOT-CE-MG mesh group as the set of local root attachment circuits, i.e., attachment circuit 21B in this case designated as R1. With respect to pseudowires 22 for which PE router 16A operates as an ingress, the PE router computes LEAF-VE-MG mesh group as the set of pseudowires 22B and 22C as both of these pseudowires lead to remote PE routers that host only leaf attachment circuits. Finally, PE router 16A computes ROOT-VE-MG mesh group as pseudowire 22A since the pseudowire egresses at remote PE router 16B that hosts one or more local root attachment circuits, i.e., attachment circuit 21D designated as R2.

Similarly, PE router 16B computes the mesh groups as shown in TABLE 2:

TABLE 2

| LEAF-CE-MG | {AC 21J} |
|---|---|
| ROOT-CE-MG | {AC 21D} |
| LEAF-VE-MG | {PW 22E, PW22D} |
| ROOT-VE-MG | {PW 22A} |

In this case, PE router 16B computes its LEAF-CE-MG mesh group as only including local attachment circuit 21J designated as leaf circuit L7. PE router 16A computers its ROOT-CE-MG mesh group attachment circuit 21D designated as R2. With respect to pseudowires 22 for which PE router 16B operates as an ingress, the PE router computes LEAF-VE-MG mesh group pseudowires 22E and 22D as both of these pseudowires lead to remote PE routers that host only leaf attachment circuits. Finally, PE router 16B computes ROOT-VE-MG mesh group as pseudowire 22A since the pseudowire egresses at remote PE router 16A that hosts local attachment circuit 21B designated as R1.

PE router 16C computes the mesh groups as shown in TABLE 3:

TABLE 3

| LEAF-CE-MG | {AC 21E, 21F} |
|---|---|
| ROOT-CE-MG | { } |
| LEAF-VE-MG | {PW 22F} |
| ROOT-VE-MG | {PW 22B, PW 22D} |

In this case, PE router 16C computes ROOT-CE-MG mesh group as a null set because the PE router has no local root attachment circuits. PE router 16D computes the mesh groups in a similar manner as shown in TABLE 4:

TABLE 4

| LEAF-CE-MG | {AC 21G, 21H} |
|---|---|
| ROOT-CE-MG | { } |
| LEAF-VE-MG | {PW 22F} |
| ROOT-VE-MG | {PW 22C, PW 22E} |

In general, each of PE routers 16 utilize the computed mesh groups when making L2 forwarding decisions to enforce the constraints required for E-TREE service or other L2 service in which L2 traffic is constrained to tree-like connectivity. For example, upon receiving an L2 frame, one of PE routers 16 does not necessarily forward the L2 frame to all of the attachment circuits and pseudowires that are participating in the VPLS domain. Instead, PE router 16A, as one example, determines the set of output ports to which the L2 frame can be switched based on the defined mesh and the switching rules described herein. For example, PE router 16A may broadcast the L2 frame to the reduced set of local attachment circuits and pseudowires as determined by the forwarding rules described herein. Furthermore, PE router 16A may apply dynamic MAC learning over the reduced set of output ports as constrained by the mesh groups. For example, if the L2 frame includes a destination MAC address that has not previously been seen and, therefore, not previously associated with a particular output port, PE router 16A broadcast the L2 frame to the local attachment circuits and pseudowires in accordance with the computed mesh groups and the forwarding rules specified herein. However, if the destination MAC address has previously been seen as sourcing L2 traffic on a given attachment circuit or pseudowire, PE router 16A dynamically associates the MAC address with the port on which it was received and switches subsequent L2 traffic destined for that MAC address out that associated port.

Figure 3A:
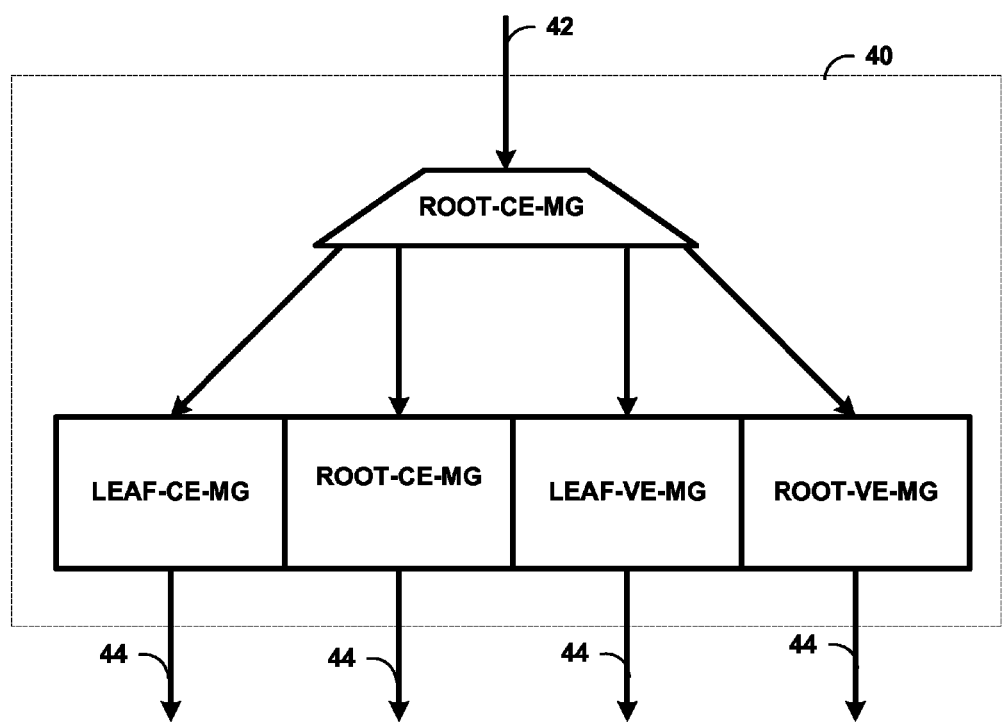
FIGS. 3A-3D illustrate switching logic implemented by a network device (e.g., any of the PE routers of FIGS. 1 and 2) in accordance with the techniques described herein.

FIGS. 3A-3D illustrates switching logic 40 implemented by a network device (e.g., any of PE routers 16 of FIGS. 1 and 2) in accordance with the techniques described herein. As shown in FIG. 3A, inbound L2 frames 42 received on an attachment circuit within the ROOT-CE-MG mesh group may be switched to any and all attachment circuits and pseudowires associated with any of the four mesh groups. Thus, inbound L2 traffic received on a local root attachment circuit may be forwarded to other root attachment circuits, local leaf attachment circuits, pseudowires to PE routers hosting only leaf attachment circuits and pseudowires to PE routers hosting one or more root attachment circuits. In accordance with MAC learning principles, in the event the destination MAC address of a given L2 frame 42 has not been previously associated with a particular port, (i.e., PE router 40 broadcasts the L2 frame to all of the ports associated with the attachment circuits 21 and pseudowires 22 of the mesh groups. Otherwise, PE router 40 may output a single copy of the L2 frame on the particular port, at least for unicast MAC addresses.

Figure 3B:
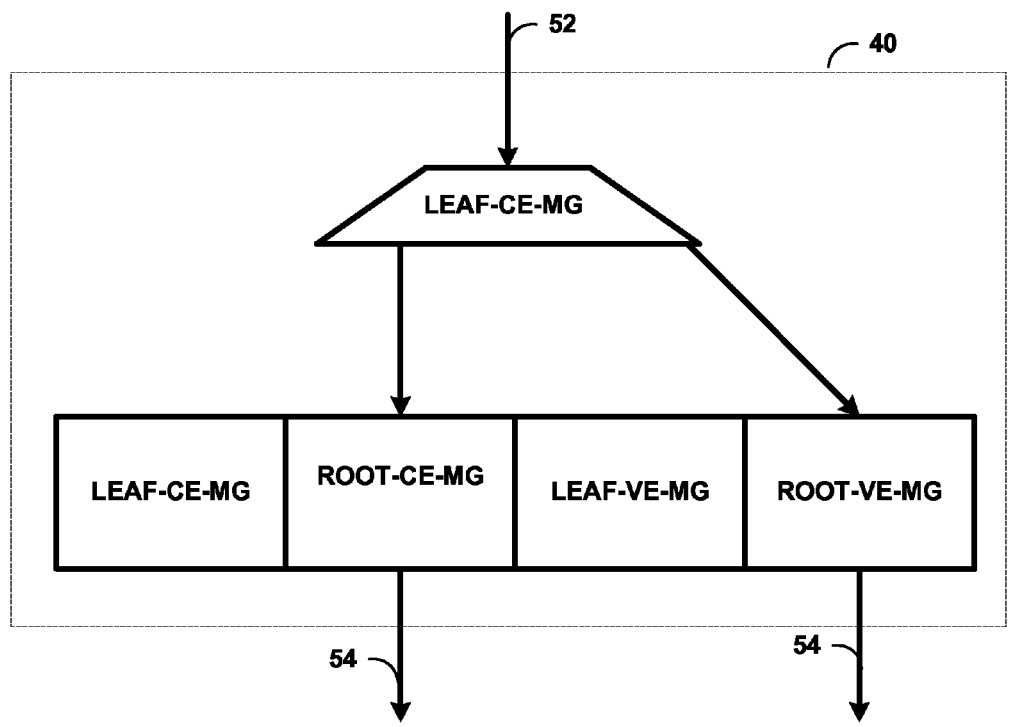

FIG. 3B illustrates switching behavior implemented by PE router 40 for inbound L2 frames 52 received on LEAF-CE-MG mesh group. Unlike the switching behavior shown in FIG. 3A, for L2 frames 52, PE router switches the inbounds frames only to local attachment circuits within the ROOT-CE-MG mesh group and to pseudowires with the ROOT-VE-MG mesh group and either broadcasts the L2 frame to all of the ports associated with the attachment circuits 21 and pseudowires 22 of these two mesh groups or outputs a single copy of each of input L2 frames depending upon the state of the MAC tables. For L2 frames 52, PE router 40 applies MAC learning between the pseudowires and attachment circuits of these mesh groups to update the MAC tables of the PE router.

Figure 3C:
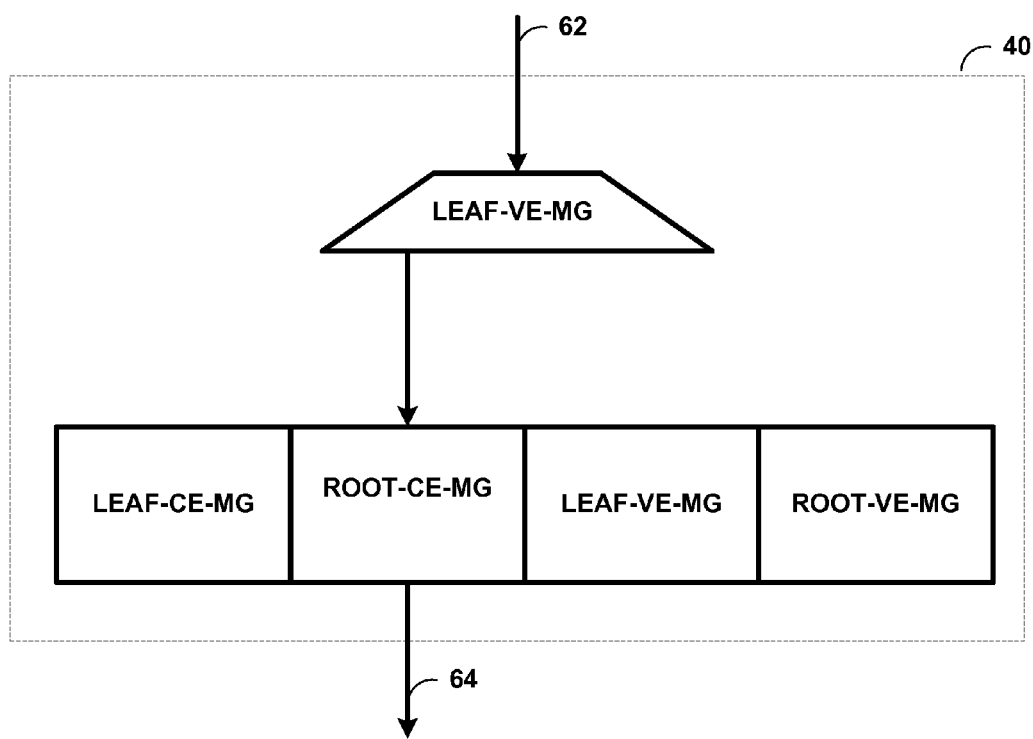

FIG. 3C illustrates switching behavior implemented by PE router 40 for inbound L2 frames 62 received on LEAF-VE-MG mesh group. In this case, PE router 40 switches inbounds frames 62 to attachment circuits with the ROOT-CE-MG mesh group, if any, and either broadcasts the L2 frame to the ports associated with the attachment circuits of that group or outputs a single copy of the L2 frame in the event MAC learning has associated the destination MAC address with a particular local root attachment circuit. PE router 40 prevents switching to any of the attachment circuits or pseudowires of the other mesh groups. This allows L2 traffic received from remote leaf attachment circuits by intermediate pseudowires to be switched onto local root attachment circuits. For L2 frames 62, PE router 40 applies MAC learning between the pseudowires on which the L2 traffic arrived and attachment circuits of the ROOT-CE-MG mesh group to update the MAC tables of the PE router.

Figure 3D:
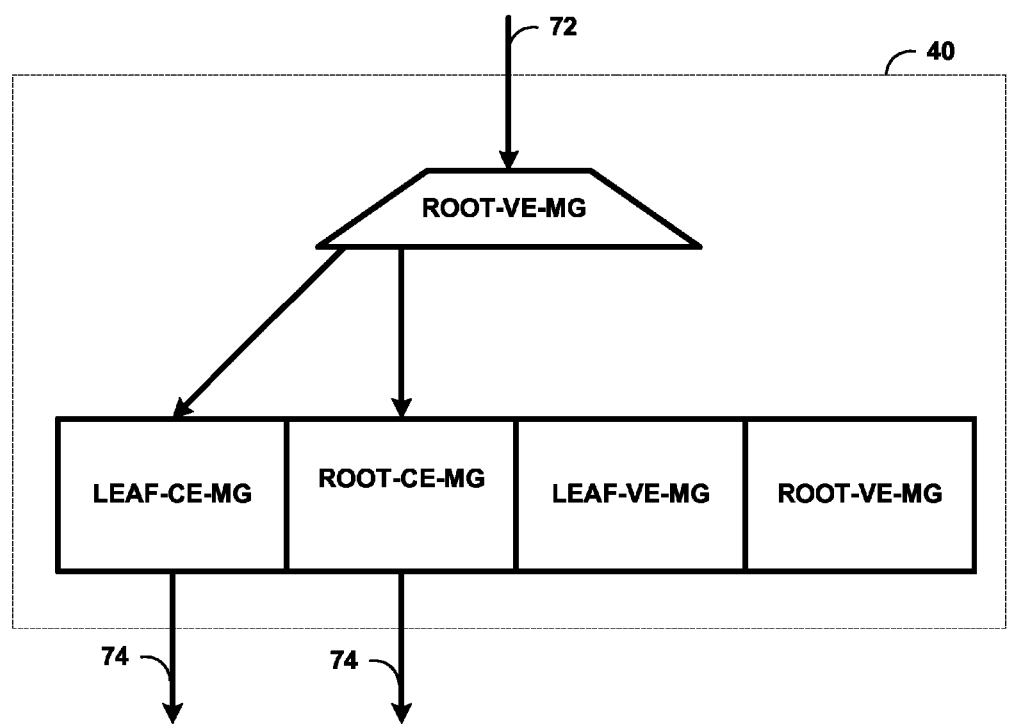

FIG. 3D illustrates switching behavior implemented by PE router 40 for inbound L2 frames 72 received on ROOT-VE-MG mesh group. In this case, PE router switches inbounds frames 72 to attachment circuits assigned to LEAF-CE-MG and ROOT-CE-MG mesh group by either broadcasting the L2 frame to the ports associated with the attachment circuits of these groups or by outputting a single copy of the L2 frame on a particular attachment circuit in the event MAC learning has associated the destination MAC address with a particular local attachment circuit. PE router 40 prevents switching to any of the pseudowires of the other mesh groups. This allows L2 traffic received from remote root attachment circuits by intermediate pseudowires to be switched onto local root or leaf attachment circuits.

When forwarding L2 traffic that was received on a pseudowire assigned to ROOT-VE-MG mesh group, as shown in FIG. 3D, the L2 traffic may have originally been sourced by either remote leaf attachment circuit or a remote root attachment circuit. In particular, the ROOT-VE-MG mesh group is used to designate the set of pseudowires originating from remote PE routers that host one or more root attachment circuits. Such remote PE routers may also host one or more leaf attachment circuits. For example, as shown in TABLE 1 above, PE router 16A computes ROOT-VE-MG as {PW 22A} because PE router 16B hosts at least one root attachment circuit, i.e., attachment circuit 21D, even though PE router 16B also hosts leaf attachment circuit 21J. L2 traffic arriving at PE router 16A on pseudowire 22A from PE router 16B may have originally been sourced by either root attachment circuit 21D (R2) or leaf attachment circuit 21J (L7). Consequently, switching all L2 traffic from pseudowires within the ROOT-VE-MG mesh group to attachment circuits associated with the LEAF-CE-MG should be allowed in only in some cases when the pseudowire originates from a remote PE router that does not host both root and leaf attachment circuits. For example, the L2 traffic from received by PE router 16A via pseudowire wire 22A should be switched to local leaf attachment circuits 21A, 211 of LEAF-CE-MG when the L2 traffic originated from a remote root attachment circuit 21D, but prevented when the L2 traffic originated from leaf attachment circuit 21J.

For this reason, the techniques described herein make use of an additional inner discriminator label that is added to the label stack of L2 packets from leaf attachment circuits by the source PE router when the source PE router hosts both local root and leaf attachment circuits. The discriminator label used by PE routers 16A and 16B that host both root and leaf local attachment circuits, but is not needed by the other PE routers that host only root or only leaf attachment circuits. When injecting L2 frames into the VPLS domain, PE routers hosting both local leaf and root attachment circuits (e.g., PE routers 16A and 16B) include an additional discriminator label in the label stack of the L2 frames that originate from a local leaf attachment circuit. Receiving PE routers utilize the discriminator label to prevent leaf-to-leaf communication. That is, PE routers prevent L2 frames having the inner discriminator label from switching from the ROOT-VE-MG to attachment circuits within the LEAF-CE-MG mesh group. This prevents leaf-to-leaf connectivity while permitting root-to-leaf connectivity. In contrast, all L2 traffic received on a pseudowire within the ROOT-VE-MG is switched to attachment circuits within the ROOT-CE-MG. This allow leaf-to-root and root-to-root connectivity.

TABLE 5, set forth below, summarizes the switching logic 40 implemented by a network device (e.g., any of PE routers 16 of FIGS. 1 and 2) in accordance with the techniques described herein. In particular, Table 4 summarizes the connectivity between the attachment circuits and the pseudowires provided by switching logic 40 of the PE router. In TABLE 4, the left column indicates the source mesh group from with an L2 frame was received and each rows indicates to which mesh group the L2 frame is permitted to be switched. A "0" indicates that the switching logic is programmed to prevent the L2 frame from being switched to attachment circuits or pseudowires of the mesh groups while a "1" indicates that the connectivity is allowed.

TABLE 5

|  | LEAF-VE-MG | LEAF-CE-MG | ROOT-VE-MG | ROOT-CE-MG |
| --- | --- | --- | --- | --- |
| LEAF-VE-MG | 0 | 0 | 0 | 1 |
| LEAF-CE-MG | 0 | 0 | 1 | 1 |
| ROOT-VE-MG | 0 | 1 | 0 | 1 |
| ROOT-CE-MG | 1 | 1 | 1 | 1 |

Figure 4:
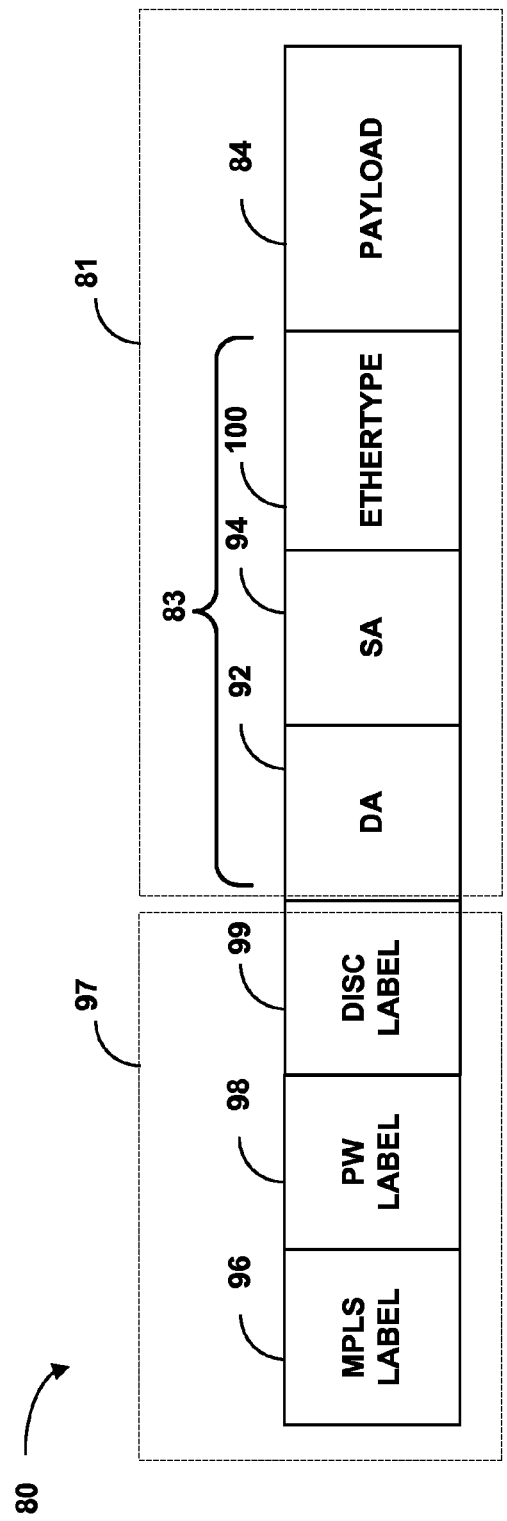
FIG. 4 is a block diagram illustrating an example format of an L2 data frame in which a discriminator label is used to identify the L2 frame as ingressing the VPLS domain by a PE router that hosts both root and leaf attachment circuits.

FIG. 4 is a block diagram illustrating an example format of an L2 data frame 80 in which a discriminator label 82 is used to identify the L2 frame as ingressing the VPLS domain by a PE router that hosts both root and leaf attachment circuits. In this example, L2 data frame 80 includes an encapsulated Ethernet frame 81 having a header 83 and a payload 84. Header 83 includes a destination MAC address (DA) 92, a source MAC address (SA) 94, and header information 100 indicating the encapsulated L2 frame is of type Ethernet ("Ethertype"). L2 data frame further includes a label stack 97 that includes an outer MPLS label 96 and pseudowire (PW) label 98, where the MPLS label typically identifies a transport label switch path (LSP) that carries one or more pseudowires, including the pseudowire identified by PW label 98. As shown in FIG. 4, label stack 97 also includes an inner discriminator label 99 that identifies whether the encapsulated Ethernet frame 85 originated from a root or leaf attachment circuit hosted by the ingress PE router. L2 data frame 80 may include additional fields not shown for purposes of simplicity. In some example embodiments, the techniques described herein, including the use of discriminator label 99, may readily be used with a point-to-multipoint (P2MP) LSP as the underlying transport LSP for carrying L2 broadcast and multicast traffic. Further information with respect to P2MP LPSs may be found in U.S. Pat. No. 7,558,219, issued Jul. 7, 2009, entitled "MULTICAST TREES FOR VIRTUAL PRIVATE LOCAL AREA NETWORK (LAN) SERVICE MULTICAST", the entire contents of which are incorporated herein by reference.

Figure 5:
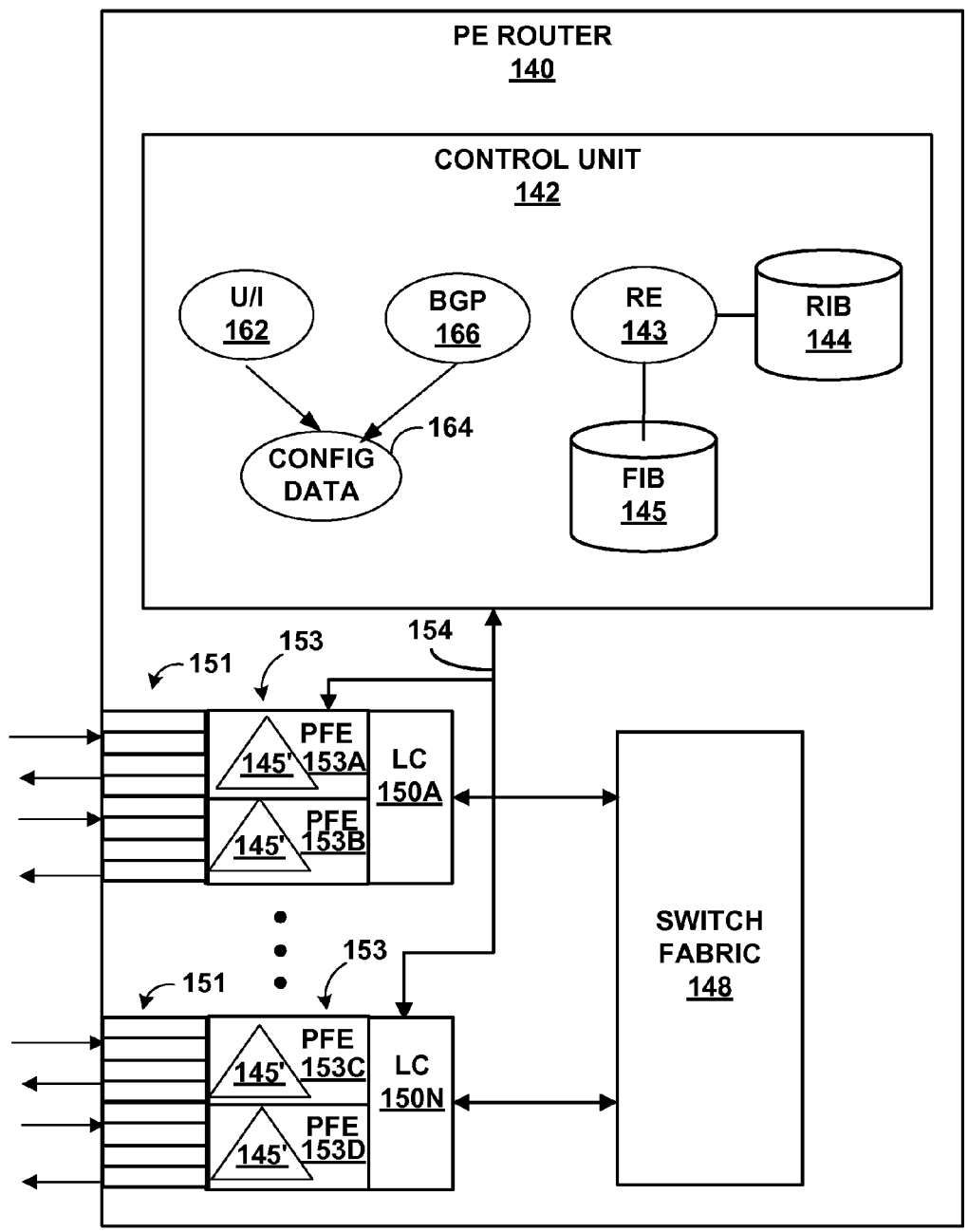
FIG. 5 is a block diagram illustrating an example PE router capable of providing integrated L3 and L2 services.

FIG. 5 is a block diagram illustrating an example PE router 140 capable of providing integrated L3 and L2 services, such as PE router 16A of metro Ethernet network 12. In this example, PE router 140 includes control unit 142 that provides control plane functionality for the L2 switch. PE router 140 also includes switch fabric 148 interconnecting a set of line cards ("LCs") 150A-150N, each of which includes a one or more of packet-forwarding engines ("PFEs") 153 that send and receive traffic by a set of interface cards 151 ("IFCs 151") that typically have one or more physical network interfaces (ports). LCs 150, components thereof, and switch fabric 148 collectively provide a data plane for forwarding transient network traffic, such as the L2 frames described herein. Although not shown in FIG. 5, PFEs 153 may each comprise a central processing unit (CPU), memory and one or more programmable packet-forwarding application-specific integrated circuits (ASICs). Switch fabric 148 provides a high-speed interconnect for forwarding incoming data packets between PFEs 153 for transmission over a network.

Control unit 142 provides control plane functions for PE router 140. For example, control unit 142 provides an environment for storing L2 network topology information, e.g., spanning tree information, executing Connectivity Fault Management (CFM) protocols that provide fault isolation and detection over large Layer 2 networks which may span several service provider networks, and providing a management interface to allow user access and configuration of PE router 140. The operating environment of control unit 142 may be implemented solely in software, or hardware, or may be implemented as a combination of software, hardware or firmware. For example, control unit 142 may include one or more processors which execute software instructions. In that case, control unit 142 may include various software modules or daemons executing on an operating system, and may include a non-transitory computer-readable storage medium, such as computer memory or hard disk, for storing executable instructions.

In the example of FIG. 5, control unit 142 includes a user interface ("U/I") 162 with which an administrator interacts, either directly or by way of a provisioning system or software agent, to classify each attachment circuit provided by interface cards 151 as either a "leaf" attachment circuit or a "root" attachment circuit. User interface 162 stores the information as configuration data 164. BGP protocol 166 operates in a modified manner to automatically inform other PE routers as to its configuration and to learn the classification of remote attachment circuits hosted by those PE routers. In this example, BGP protocol 166 computes a routing community for PE router 140 based on whether the PE router locally hosts only leaf attachment circuits or at least one root attachment circuit. For example, if configuration data 164 indicates that that PE router hosts only leaf attachment circuits, PE router 140 classifies itself as a member of a first specially-defined BPG routing community and advertises that BGP routing community to the other PE routers via BGP messages. Alternatively, if configuration data 164 indicates that that PE router hosts at least one root attachment circuit, PE router 140 classifies itself as a member of a second specially-defined BPG routing community and advertises that BGP routing community to the other PE routers via BGP messages.

Control unit 142 also provides an operating environment for execution of a routing instance 143 that controls L3 routing and L2 forwarding functions. In general, routing instance 143 maintains a routing information based (RIB) 144 that stores L3 routing information and L2 topology data representing a logical topology of the L2 network, e.g., a spanning tree, from the perspective of the interfaces. RIB 144 may also store updated MAC tables, MPLS label allocations and pseudowire information. Based on RIB 144, RE 143 generates forwarding information based (FIB) 145 to contain forwarding data structures for programming PFEs 153.

In accordance with the techniques described herein, RE 143 computes mesh groups for its locally hosted attachment circuits as well as pseudowires defined within RIB 144 based on configuration data 164 and the routing communities learned for the remote PE routers. As explained herein, RE 143 may compute the mesh groups to classify local attachment circuits and pseudowires leading to other PE routers: (1) "LEAF-CE-MG" for local leaf attachment circuits, (2) "ROOT-CE-MG" for local root attachment circuits, (3) "LEAF-VE-MG" for pseudowires leading to remote PE routers hosting only leaf attachment circuits, and (4) "ROOT-VE-MG" for remote PE routers hosting one or more root attachment circuits. RE 143 stores the computed mesh groups in RIB 144 and generates the forwarding data structures of FIB in accordance with the switching logic illustrated in FIGS. 3A-3D for programming PFEs 153.

In this example, control unit 142 is connected to each of LCs 150 by a dedicated internal communication link 154. For example, dedicated link 154 may comprise a 200 Mbps or Gigabit Ethernet connection. In one embodiment, control unit 142 communicates data representative of a software copy 145' of FIB 145 into PFEs 153 to program the PFEs and thereby control forwarding of traffic by the corresponding components within the data plane that are associated with each of routing instances 157. This allows the software FIB stored in memory (e.g., on-chip RAM) of in each of PFEs 153 to be updated without degrading packet-forwarding performance of PE router 140. In some instances, control unit 142 may derive separate and different software FIBs for each respective PFEs 153. In addition, one or more of PFEs 153 may include packet-forwarding ASICs (not shown) that PFEs 153 program with a hardware-copy of FIB based on the software FIBs (i.e., hardware versions of the software FIBs) copied to each respective PFE 30. In other, more complex embodiment, L2 switch may have many more LCs 150 (e.g., 48 or 64 FPCs), each of which may have four PFEs 150 that each couple to up to sixteen interface cards 151.

The techniques may allow PE router 140 to efficiently implement an E-TREE service within a VPLS domain or other L2 VPN that typically is used to provide full multi-point to multi-point connectivity. In this way, the techniques described herein may be viewed as backward compatible with existing networks that implement VPLS or other forms of L2 VPNs. For example, only PE routers hosting both leaf and root endpoints may need to be upgraded to implement a modified forwarding scheme in which L2 frames are tagged with an additional discriminator label. Further, the techniques may take advantage of the auto discovery procedures described herein so as to require little provisioning by an administrator.

Various embodiments of the invention have been described. These and other embodiments are within the scope of the following claims.

The invention claimed is:
1. A method comprising:
  storing configuration data within a network device that switches layer two (L2) communications between local attachment circuits hosted by the network device and a plurality of pseudowires that connect the network device to a plurality of remote network devices of a L2 virtual private network (VPN), wherein the L2 VPN provides point-to-multipoint (P2MP) connectivity between a plurality of customer devices, the plurality of customer devices including one or more root customer devices permitted to communicate with any of the customer devices and further including one or more leaf customer devices permitted to communicate with only the root customer devices, wherein the configuration data classifies each local attachment circuit of the network device as either a root attachment circuit that couples the network device to one of the root customer devices or a leaf attachment circuit that couples the network device to one of the leaf customer devices, and wherein the configuration data identifies each of the remote network devices as hosting only leaf attachment circuits that couple the remote network device to one or more of the leaf customer devices or hosting at least one root attachment circuit that couples the remote network device to one of the root customer devices;

assigning the local attachment circuits of the network device and the pseudowires to a plurality of mesh groups for the L2 VPN based on the configuration data; and switching the L2 communications between the attachment circuits of the network device and the pseudowires based on the mesh groups to constrain the L2 VPN to the point-to multipoint (P2MP) connectivity.

2. The method of claim 1, wherein switching the L2 communications based on the mesh groups comprises switching the L2 communications between the attachment circuits of the network device and the pseudowires to prevent L2 communications from being forwarded between a first one of the mesh groups in which the local attachment circuits of the network device are designated as leaf attachment circuits and a second one of the mesh groups in which the attachment circuits hosted by the remote network devices are designated as leaf attachment circuits.

3. The method of claim 1,
wherein the L2 VPN comprises a virtual private LAN service (VPLS) that provides full-mesh L2 connectivity between the network devices, and
wherein switching the L2 communications based on the mesh groups comprises switching the L2 communications between the attachment circuits of the network device and the pseudowires in a constrained manner to provide tree-like connectivity between the local attachment circuits of the network device and the attachment circuits hosted by the remote network devices.

4. The method of claim 1, wherein assigning the local attachment circuits and the pseudowires to a plurality of mesh groups for the L2 VPN based on the data comprises:
assigning to a first mesh group all local attachment circuits designated as leaf attachment circuits;
assigning to a second mesh group all local attachment circuits designated as root attachment circuits;
assigning to a third mesh group all pseudowires leading from the network device to one of the remote network devices identified as hosting only leaf attachment circuits; and
assigning to a fourth mesh group all pseudowires leading from network device to one of the remote network devices identified as hosting one or more root attachment circuits.

5. The method of claim 4, further comprising:
receiving an L2 communication on one of the local attachment circuits designated as a leaf attachment circuit assigned to the first mesh group,
wherein switching the L2 communication comprises switching the L2 communication to the local attachment circuits of the second mesh group and the pseudowires of the fourth mesh group while preventing the L2 communication from being switched to the local attachment circuits of the first mesh group and the pseudowires of the third mesh group.

6. The method of claim 5, wherein switching the L2 communication comprises including inserting an additional discriminator label within a label stack of the L2 communication prior to outputting the L2 communication on the pseudowires of the fourth mesh group, wherein the discriminator label identifies the L2 communication as originating from a local attachment circuit that is designated as a leaf attachment circuit.

7. The method of claim 4, further comprising:
receiving an L2 communication on one of the local attachment circuits designated as a root attachment circuit assigned to the second mesh group,
wherein switching the L2 communication comprises switching the L2 communication to the local attachment circuits of both the first and second mesh group and the pseudowires of both the third and fourth mesh group.

8. The method of claim 4, further comprising:
receiving an L2 communication on one of the pseudowires assigned to the third mesh group as leading from the network device to one of the remote network devices identified as hosting only leaf attachment circuits,
wherein switching the L2 communication comprises switching the L2 communication to the local attachment circuits of the second mesh group while preventing the L2 communication from being switched to the local attachment circuits of the first mesh group and the pseudowires of the third and fourth mesh groups.

9. The method of claim 4, further comprising:
receiving an L2 communication on one of the pseudowires assigned to the fourth mesh group as leading from the network device to one of the remote network devices identified as hosting at least one root attachment circuit,
wherein switching the L2 communication comprises:
determining whether the L2 communication includes a discriminator label indicating that identifies the L2 communication as originating from an attachment circuit hosted by one of the remote network devices that is designated as a leaf attachment circuit;
when the L2 communication does not include the discriminator label, switching the L2 communication to the local attachment circuits of the first and second mesh group while preventing the L2 communication from being switched to the pseudowires of the third and fourth mesh groups; and
when the L2 communication includes the discriminator label, switching the L2 communication to the local attachment circuits of the second mesh group while preventing the L2 communication from being switched to the local attachment circuits of the first mesh group and the pseudowires of the third and fourth mesh groups.

10. The method of claim 1, further comprising receiving the configuration data classifying each attachment circuit of the network device as either a root attachment circuit or a leaf attachment circuit from an administrator.

11. The method of claim 1, further comprising receiving routing communications from the remote network devices in accordance with a routing protocol, wherein the routing communication specifies routing communities for the remote network devices, wherein a first one of the routing communities identifies the remote network devices that hosting only leaf attachment circuits and a second one of the routing communities identifies the remote network devices that host at least one root attachment circuit.

12. The method of claim 1, wherein the L2 communication comprises an Ethernet frame.

13. The method of claim 1, wherein the network device comprises a router operating as an L2 network switch.

14. A network device comprising:
a set of interfaces to couple the network device to local attachment circuits that carry layer two (L2) communications;
a set of interfaces to couple the network device to a plurality of remote network devices that provide an L2 virtual private network (VPN) for a plurality of customer devices by encapsulating the L2 communications within pseudowires, wherein the plurality of customer devices includes one or more root customer devices permitted to communicate with any of the customer devices and further including one or more leaf customer devices permitted to communicate with only the one or more root customer devices;
a computer-readable storage medium storing configuration data that classifies each of the local attachment circuits of the network device as either a root attachment circuit that couples the network device to one of the root customer devices or a leaf attachment circuit that couples the network device to one of the leaf customer device, and wherein the configuration data identifies each of the remote network devices as hosting only leaf attachment circuits that couple the remote network device to one or more of the leaf customer devices or hosting at least one root attachment circuit that couples the remote network device to one of the root customer devices;
a control unit to assign the local attachment circuits of the network device and the pseudowires to a plurality of mesh groups for the L2 VPN based on the configuration data; and
a switching element programmed to switch the L2 traffic between the attachment circuits of the network device and the pseudowires based on the mesh groups to constrain the L2 VPN to point-to-multipoint (P2MP) connectivity.

15. The network device of claim 14, the control unit assigns the local attachment circuits and the pseudowires to the mesh groups and programs the switching element in accordance with the mesh groups to prevent L2 communications from being switched between the local attachment circuits of the network device that are designated as leaf attachment circuits and the attachment circuits hosted by the remote network devices that are designated as leaf attachment circuits.

16. The network device of claim 14,
wherein the L2 VPN comprises a virtual private LAN service (VPLS) that provides full-mesh L2 connectivity between the network devices, and the control unit assigns the local attachment circuits and the pseudowires to the mesh groups and programs the switching element in accordance with the mesh groups to switch the L2 communications between the attachment circuits of the network device and the pseudowires in a constrained manner to prevent L2 communications from being switched between the local attachment circuits of the network device that are designated as leaf attachment circuits and the attachment circuits hosted by the remote network devices that are designated as leaf attachment circuits.

17. The network device of claim 14, wherein the control unit executes a software process configured to construct the mesh groups to include:
a first mesh group having local attachment circuits designated as leaf attachment circuits;
a second mesh group having local attachment circuits designated as root attachment circuits;
a third mesh group having pseudowires leading from the network device to one of the remote network devices identified as hosting only leaf attachment circuits; and
a fourth mesh group having pseudowires leading from network device to one of the remote network devices identified as hosting one or more root attachment circuits.

18. The network device of claim 17, wherein the control unit programs the switching element to switch L2 communications received from the leaf attachment circuits of the first mesh group to the root attachment circuits of the second mesh group and the pseudowires of the fourth mesh group while preventing the L2 communication from being switched to the leaf attachment circuits of the first mesh group and the pseudowires of the third mesh group.

19. The network device of claim 17, wherein the switching element inserts an additional discriminator label within a label stack of the L2 communications prior to outputting the L2 communications on the pseudowires of the fourth mesh group, wherein the discriminator label identifies the L2 communications as originating from a local attachment circuit that is designated as a leaf attachment circuit.

20. The network device of claim 17, wherein the control unit programs the switching element to switch L2 communications received from the root attachment circuits of the second mesh group to the leaf and root attachment circuits of the first and second mesh group and the pseudowires of both the third and fourth mesh group.

21. The network device of claim 17, wherein the control unit programs the switching element to switch L2 communications received from the pseudowires of the third mesh group to the local attachment circuits of the second mesh group while preventing the L2 communication from being switched to the local attachment circuits of the first mesh group and the pseudowires of the third and fourth mesh groups.

22. The network device of claim 17,
wherein the control unit programs the switching element to determine whether L2 communications received from the pseudowires assigned to the fourth mesh group include discriminator labels indicating that identifies the L2 communications as originating from attachment circuits hosted by one of the remote network devices that is designated as a leaf attachment circuit,
wherein, when the L2 communication does not include the discriminator label, the switching element switches the L2 communication to the local attachment circuits of the first and second mesh group while preventing the L2 communication from being switched to the pseudowires of the third and fourth mesh groups, and
wherein, when the L2 communication includes the discriminator label, the switching element switches the L2 communication to the local attachment circuits of the second mesh group while preventing the L2 communication from being switched to the local attachment circuits of the first mesh group and the pseudowires of the third and fourth mesh groups.

23. The network device of claim 14, further comprising a user interface to receive the configuration data classifying each attachment circuit of the network device as either a root attachment circuit or a leaf attachment circuit.

24. The network device of claim 14, further comprising a routing protocol executing on within the control unit, wherein the routing protocol receives routing communications from the remote network devices, wherein the routing communications specify routing communities for the remote network devices to identify the remote network devices as hosting only leaf attachment circuits or hosting at least one root attachment circuit.

25. The network device of claim 14, wherein the L2 communications comprises Ethernet frames.

26. The network device of claim 14, wherein the network device comprises a router operating as an L2 network switch and the switching element comprises a packet forwarding engine (PFE) capable of both switching the L2 communications.

27. A non-transitory computer-readable storage medium comprising instructions to cause a programmable microprocessor to:

access configuration data within stored within a network device that switches layer two (L2) communications between local attachment circuits hosted by the network device and a plurality of pseudowires of an L2 virtual private network (VPN) that connect the network device to a plurality of remote network devices, wherein the L2 VPN provides point-to-multipoint (P2MP) connectivity between a plurality of customer devices, the plurality of customer devices including one or more root customer devices permitted to communicate with any of the customer devices and further including one or more leaf customer devices permitted to communicate with only the root customer devices, wherein the configuration data classifies each local attachment circuit of the network device as either a root attachment circuit that couples the network device to one of the root customer devices or a leaf attachment circuit that couples the network device to one of the leaf customer devices, and wherein the configuration data identifies each of the remote network devices as hosting only leaf attachment circuits that couple the respective remote network device to one or more of the leaf customer devices or hosting at least one root attachment circuit that couples the respective remote network device to one of the root customer devices;

assign the local attachment circuits of the network device and the pseudowires to a plurality of mesh groups for the L2 VPN based on the configuration data; and program a forwarding engine of the network device to switch the L2 communications between the attachment circuits of the network device and the pseudowires based on the mesh groups to constrain the L2 VPN to tree-based connectivity.

\* \* \* \* \*